(12) United States Patent
Tolliver

(10) Patent No.: US 8,830,621 B2
(45) Date of Patent: Sep. 9, 2014

(54) METHOD AND APPARATUS FOR CONTROLLING LOAD OPERATIONS OF A DATA STORAGE CARTRIDGE THAT HAS BEEN SUBJECTED TO A SHOCK EVENT

(75) Inventor: Wayne D. Tolliver, Washington, DC (US)

(73) Assignee: Shocksense Enterprises, LLC, Chicago, IL (US)

( * ) Notice: Subject to any disclaimer, the term of this patent is extended or adjusted under 35 U.S.C. 154(b) by 0 days.

(21) Appl. No.: 13/373,570

(22) Filed: Nov. 18, 2011

(65) Prior Publication Data

US 2013/0128384 A1     May 23, 2013

(51) Int. Cl.
 *G11B 5/008*     (2006.01)
 *G11B 15/68*     (2006.01)
 *G11B 23/04*     (2006.01)
 *G11B 33/10*     (2006.01)

(52) U.S. Cl.
 CPC .............. *G11B 15/68* (2013.01); *G11B 23/042* (2013.01); *G11B 33/10* (2013.01); *G11B 23/046* (2013.01)
 USPC ........................................................... 360/93

(58) Field of Classification Search
 None
 See application file for complete search history.

(56) References Cited

U.S. PATENT DOCUMENTS

| | | | |
|---|---|---|---|
| 5,949,342 A * | 9/1999 | Frary et al. | 340/665 |
| 6,633,454 B1 * | 10/2003 | Martin et al. | 360/132 |
| 2003/0067703 A1 * | 4/2003 | Holmes et al. | 360/69 |
| 2006/0092544 A1 * | 5/2006 | Skaar et al. | 360/61 |
| 2009/0020609 A1 * | 1/2009 | Cohen et al. | 235/462.01 |
| 2010/0327051 A1 * | 12/2010 | Lyon et al. | 235/375 |

* cited by examiner

*Primary Examiner* — David D Davis
(74) *Attorney, Agent, or Firm* — Patrick P. Phillips

(57) ABSTRACT

A removable data storage cartridge has a shock sense indicator attached to its housing. The indicator includes a sensing structure that reacts to a shock event over a specified threshold. The invention indicates a physical shock event upon appropriate inquiry by the reader mechanism. Upon detecting that a shocked data storage cartridge has been loaded into a data storage library, the library and/or data storage drive alerts the operator and/or system administrator and moves the shocked cartridge to a quarantine pool to prevent damage to the data storage drive.

15 Claims, 5 Drawing Sheets

METHOD AND APPARATUS FOR CONTROLLING LOAD OPERATIONS OF A DATA STORAGE CARTRIDGE THAT HAS BEEN SUBJECTED TO A SHOCK EVENT

BACKGROUND OF THE INVENTION

1. Field of the Invention

The present invention relates generally to data storage systems, and more particularly, to a method and apparatus for controlling load operations of a data storage cartridge that has been subjected to a shock event.

2. Description of the Related Art

This invention is directed to the providing of a method and apparatus for controlling load operations of a data storage cartridge that has been subjected to a shock event. One of the problems facing organizations that use magnetic tape media to protect their data is what can happen when a data storage cartridge is dropped. When a data cartridge sustains g-forces in excess of 40 G it is much more likely to experience failure during restore operations. According to those knowledgeable in the art, up to 35% of all restore failures can be traced to dropped or damaged data cartridges.

Dropped data cartridges can experience damage in one of two ways. One way that dropped data cartridges may experience significant damage to the tape edge is via impact to the external case, which impact is transmitted to the reel and subsequently to the tape. Damage to the tape edge can render read or write operations on the tracks in that damaged location unreliable or impossible. Dropped data cartridges may continue to operate for a period of time after being dropped, since the tape may not write or read data in the outer tracks due to low utilization. This can lead to a false sense of reliability by backup administrators, since the cartridge may appear to operate normally after being dropped, when in reality it has been damaged.

Another way that dropped data cartridges may experience significant damage is by displacement of the leader pin as a result of the cartridge experiencing an excessive g-force during a drop event. A sudden deceleration may deform the plastic cartridge enclosure and slot where the leader pin is normally held, thereby causing the leader pin to move out of reference position. If the leader pin moves out of reference position, the data storage drive may not be able to successfully load the cartridge.

In certain circumstances, a malfunction can occur during the load operation of a dropped cartridge, which may render both the cartridge and the data storage drive inoperable. Many data storage drive manufacturers will void the drive warranty if a defective cartridge is loaded into the drive and a malfunction results. Data stored on a cartridge that has malfunctioned in this way may become irretrievable.

Further compounding the issue is failure by backup operators and administrators to take appropriate action when a tape cartridge is dropped. Factors contributing to the problem are: (1) failure of operators and backup administrators to understand the negative effects of excessive g-forces on dropped media; (2) Failures of operators and backup administrators to report dropped cartridges to management for fear of reprimand; and (3) failure to remove dropped media from active storage pools.

Depending on the value of the data stored on the cartridge and the severity of damage, dropped media may be duplicated, but dropped cartridges should be treated as read only. Ideally, dropped cartridges should be taken out of service as soon as possible to avoid any potential negative impact on data storage drives and to preserve library performance during backup and restore operations.

The impact of dropped data cartridges is two-fold. First, dropped data cartridges are more likely to fail or cause errors during restore operations and either of these events can delay system recovery by negatively impacting the Recovery Time Objective (RTO), since the administrator will likely need to abort the current restore operation. Restoring the data from the next previous backup also significantly delays system availability. (Offsite media will also significantly delay the recovery process.) Secondly, irretrievable data from dropped cartridges may negatively impact the Recovery Point Objective (RPO), since the system may not be able to be restored to the desired state. As a consequence, data may be lost. Reverting to the previous full backup, which is usually at least 24 hours, or 7 or 14 days old will likely inhibit achieving the desired RPO.

If backup administrators have knowledge of cartridge mishandling, they can preemptively adjust backup processes and procedures to maintain acceptable RTO and RPO in the event of data loss. Loading dropped cartridges into drives may result in a drive becoming inoperable and being removed from service. Repair requires removal of the drive (with the cartridge partially loaded) from the library and the return of the drive to the manufacturer for extraction of the data cartridge and repair of the drive. Sometimes this incurs great cost to the customer, as this type of repair is not usually covered under warranty. Removing data storage drives from service may also negatively impact an organization's ability to adequately protect its data or perform restore operations until the asset is returned to service.

While it is apparent that the problems associated with a storage cartridge that has been subjected to a shock event have been recognized, no solution has been found. It is thus readily apparent that the long-felt need continues to exist for a method and apparatus for controlling load operations associated with data storage cartridges that have been subjected to a shock event.

SUMMARY OF THE INVENTION

In accordance with this invention an apparatus for controlling load operations of a data storage cartridge that has been subjected to a shock event is provided, the apparatus being a removable data storage cartridge device having a housing, a tape medium contained in the housing, and a passive shock detection sensor secured to the housing that records shock to the cartridge by indicating a machine-readable shocked status. The shock is a deceleration of the data storage cartridge at a predetermined threshold, with the predetermined threshold being at least 390 m/sec2 or 40 G.

Preferably, the shock detection sensor is integrated in a barcode label attached to the cartridge. Preferably, the barcode label has a barcode data string consisting of a start character, a plurality of alphanumeric characters, an optional checksum character, and a stop character. In one embodiment of the invention, each of the start and stop characters are preceded and followed by quiet zones. In one embodiment, a portion of the label indicates if a shock event has occurred. Additionally, the existence of a shock event of a predetermined threshold can be visually displayed on the cartridge.

There is also disclosed a tape library comprising a chassis containing any number of drive or media frames, slots that store removable data storage cartridges, data storage drives that read and write data storage cartridges, a transporter mechanism that imports, exports and moves data storage cartridges between slots, from a slot to a drive, or from a drive to a slot, a network connection to communicate with backup software applications, a front panel having a display and means for issuing commands and receiving feedback from the tape library, and a controller, with the controller including an operating system that manages the tape library, and with the operating system containing specialized add-on code to instruct the transporter mechanism to detect shocked cartridge status via disrupted barcode.

The tape library has an entry/exit pool and a tape library barcode reader. The tape library has firmware and/or an operating system that can be altered to prevent loading of a damaged cartridge into a data storage drive mechanism. The tape library controller alerts the operator and/or administrator of the tape library as to the presence of a shocked cartridge via the tape library front panel, and/or the backup software administration, and/or the operator console(s).

There is also disclosed a method for controlling data storage cartridge load operations in a data storage system comprising the steps of querying the shock status of a data cartridge when the cartridge is imported into a tape library, moving a shocked cartridge to dedicated slots in the tape library should the query of the cartridge indicate a shocked status, the dedicated slots defining the quarantine pool, and inhibiting the movement of any cartridges in the quarantine pool, the tape library being configurable to allow export from the library or to allow an operator override to continue load operations.

The method also includes the step of sending SCSI commands to the backup system indicating the cartridge location in the library and the disabled status of the cartridge. The method also includes the step of sending XML formatted data via a library controller network interface indicating the cartridge location in the library and the disabled status of the cartridge.

The primary objective of this invention is to passively and unobtrusively detect shock events of a predetermined threshold for industry standard or proprietary cartridge formats.

Another objective is to provide a data storage cartridge that can record a shock event so that the existence of the shock event can be ascertained by being machine readable using the type of existing barcode reading equipment that is present in modern tape libraries, with no change to hardware and only minor changes to software and/or firmware potentially required.

Still another objective is to provide existing tape libraries with a method that can be integrated into existing tape libraries, with only minor changes to software and/or firmware. An important aspect of this objective is that the method would physically isolate shocked cartridges and prevent the loading of shocked cartridges into drives.

Yet another objective is to provide a method to prevent loading of shocked cartridges into drives via automated mechanisms and to alert storage administrators of the presence of a shocked cartridge either indirectly (through operator intervention by the removing of the shocked cartridge(s) from the tape library) or directly (by network communication with commercially available backup software packages) so that: (1) the data on a disk (or on a source tape, in the case of a cartridge duplication operation) may be protected using an alternate cartridge and (2) the shocked cartridge may be removed from service.

Other objects and advantages of the invention will be apparent from the following description, the accompanying drawings, and the appended claims.

Figure 1:
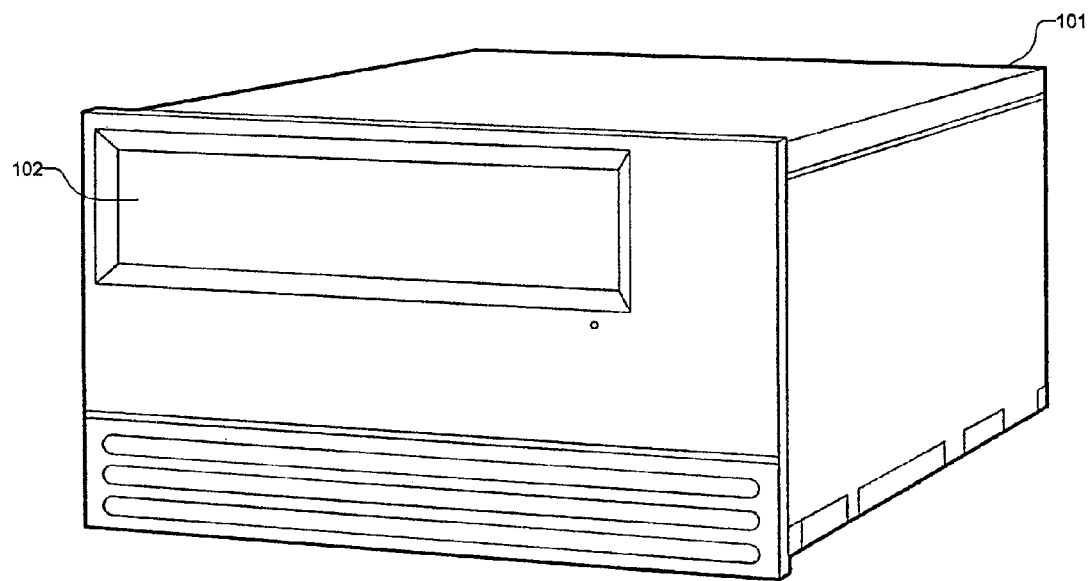
FIG. 1 is a perspective view of a data storage drive made in accordance with the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Having reference to the drawings, attention is directed first to FIG. 1 which discloses a data storage drive 101 made in accordance with the present invention. The current version of the data storage drive 101 is similar to prior art data storage drives and has an opening 102 to permit loading of a data storage cartridge.

Figure 2:
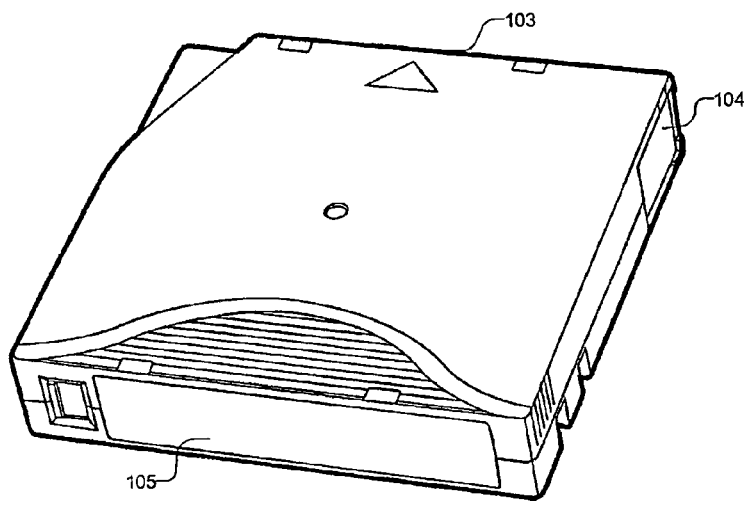
FIG. 2 is a perspective view of a removable data storage cartridge made in accordance with the present invention.

The data storage cartridge associated with the invention is disclosed in FIG. 2 and is designated by the numeral 103. The cartridge 103 has a designated label area 105 inside of which the cartridge label of the type used on such data storage cartridges must fit. The data storage cartridge 103 may further be comprised of an access door 104 that can open and close in order to allow a data storage drive to access the leader pin and extract the tape within for reading or writing in the manner known in the prior art. In accordance with the present description of the data storage device 103 on which the device label may reside, a passive shock detection sensor may be enclosed within, on, or around the data storage device label. A passive shock detection sensor is characterized as being a mechanical device and does not require application, transmission or storage of electrical current to detect, record or indicate that a shock event has occurred. As such, the sensor is electrically non-invasive and does not require addition of electro-mechanical devices, batteries, circuits or electrical current to be applied, stored, or transmitted inside the cartridge housing.

Figure 3:
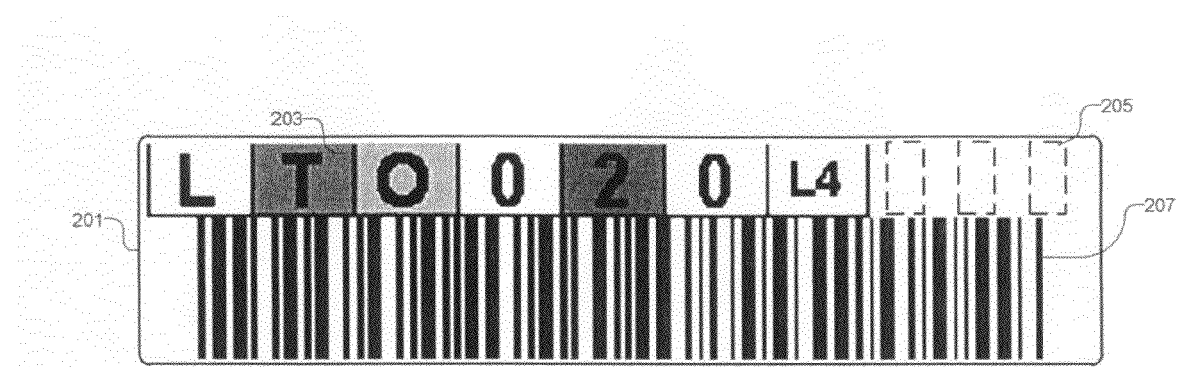
FIG. 3 discloses one embodiment of a shock sense indicator in a normal state integrated within a cartridge label for use on the removable data storage cartridge as shown in FIG. 2.
Figure 4:
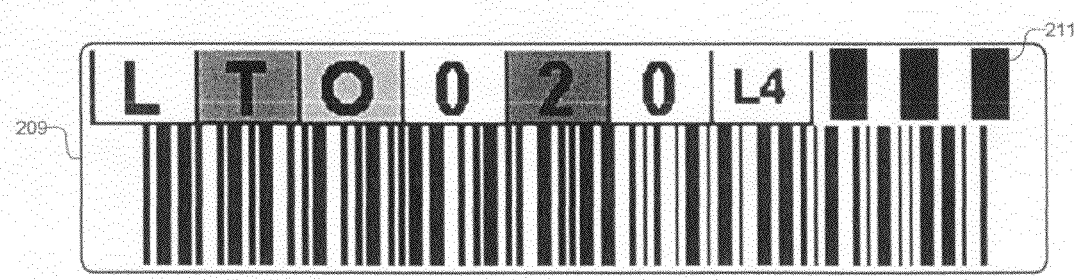
FIG. 4 discloses the embodiment of a shock sense indicator as shown in FIG. 3, but in a shocked state.

FIG. 3 discloses a view of a data storage cartridge label 201 in a normal state, while FIG. 4 discloses a view of a data storage cartridge label in a shocked state 209. The label 201 is comprised of a customer configurable label area 203, a machine-readable barcode area 207 and an area for the viewable portion of shock sensing structure 205. FIG. 4 discloses the data storage cartridge label 201 in a shocked state, with the shocked state being shown by the presence of black bar codes 211 on the front of the cartridge label 201 in the area for the viewable portion of shock sensing structure 205.

Figure 5:
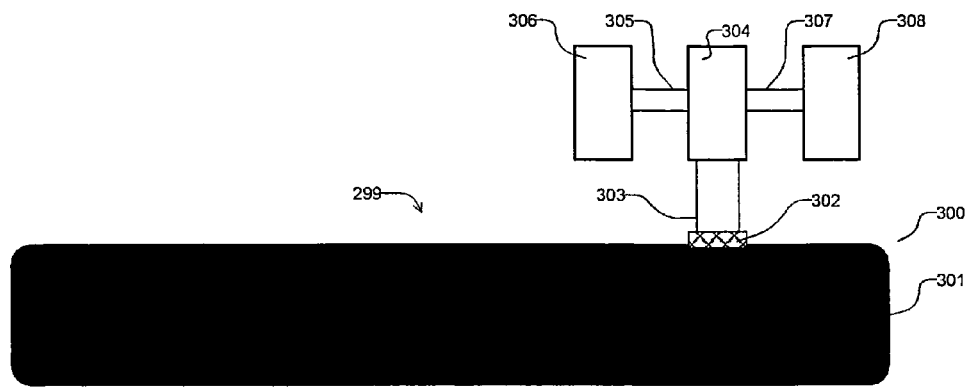
FIG. 5 discloses a schematic diagram of one embodiment of a shock sensing structure that may be integrated into the cartridge label as shown in FIG. 2.

FIG. 5 is a schematic of an embodiment of the shock sensing structure 300 of the present invention. In this embodiment, a main reservoir 300 of black ink 301 is maintained under pressure and restrained by a barrier 302 that is manufactured to fracture at a specified deceleration threshold. Upon fracture, the barrier 302 will release the ink 301 from the main reservoir 300 into the vertical transfer tube 303 and then flow into the intermediate reservoir 304. As the intermediate reservoir 304 is filled, ink will eventually flow into horizontal transfer tubes 305 and 307 and finally enter the outer reservoirs 306 and 308 respectively. The vertical transfer tube 303, intermediate reservoir 304, left and right outer reservoirs 306 and 308 respectively, and horizontal transfer tubes 305 and 307 are manufactured under vacuum to enable quick and even distribution of the ink 301 or other colored liquid from main reservoir 300 upon fracture of barrier 302.

Figure 6:
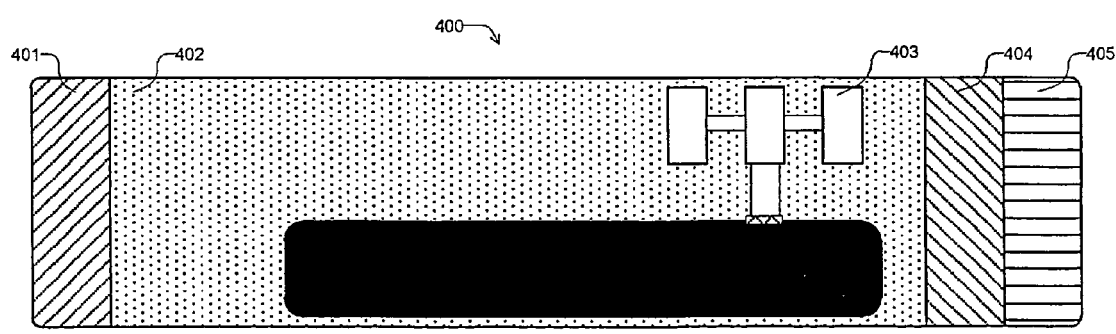
FIG. 6 discloses a schematic diagram illustrating the various components of a modified label with the shock sensing structure embedded in a further embodiment of the present invention.

FIG. 6 is a schematic diagram illustrating the construction of a tape label with an embodiment of the present invention 300. The tape label will be composed starting from back to front first of a double-sided adhesive 401, which is adhered to a white paper backing material 402. The present invention 403 will be positioned precisely within the label area per customer specification and covered with a white label 404 with three clear apertures to allow the reservoirs 306, 304, 308 to remain visible. Finally, a clear protective coating with a matte finish and single sided adhesive 405 will be applied over the label to secure the protective coating 404 and to provide a substrate suitable for printing color labels and barcodes.

Figure 7:
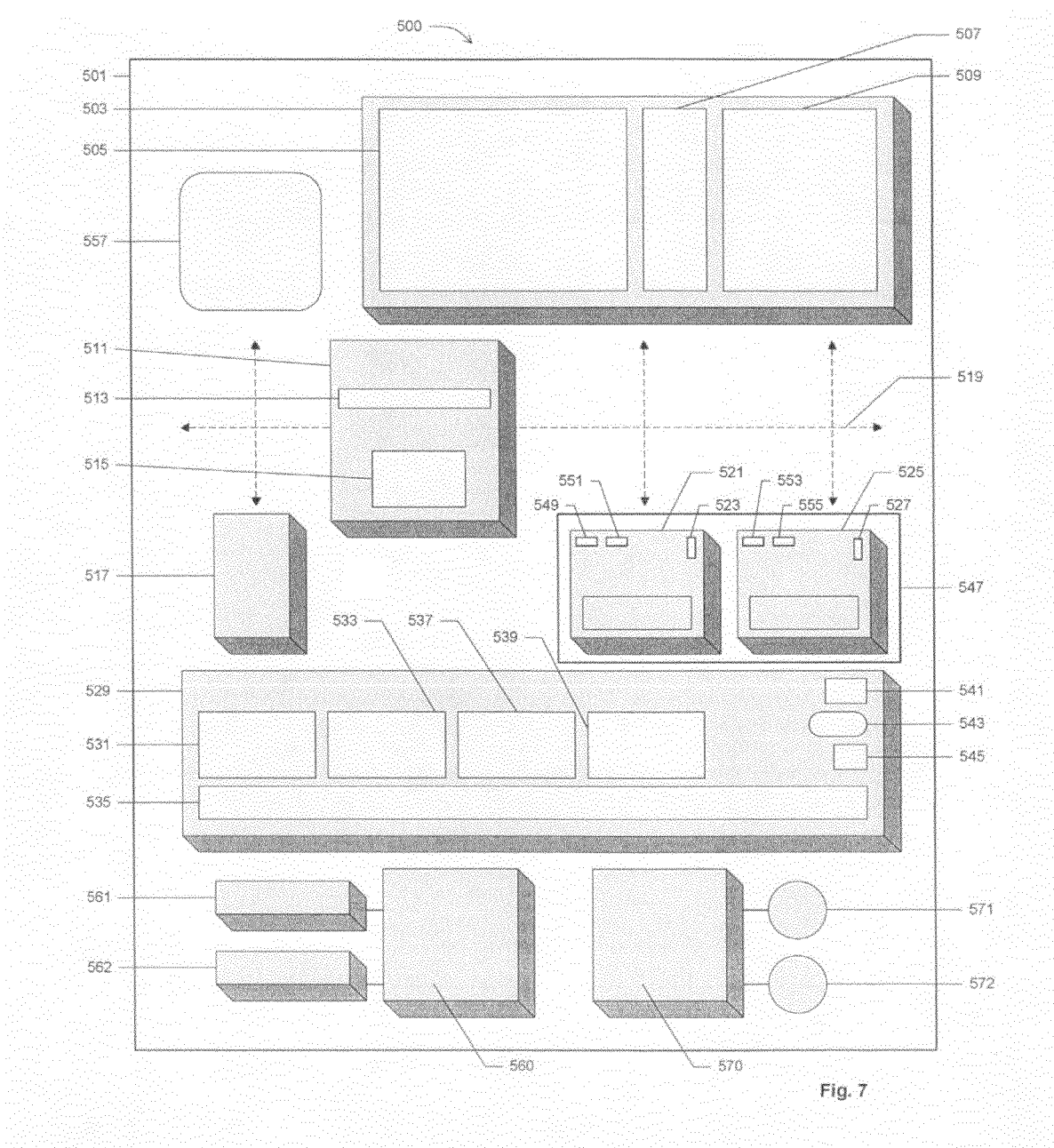
FIG. 7 is a functional block diagram of a data storage system illustrating components used in operation of a method in accordance with a further embodiment of the present invention.
Figure 8:
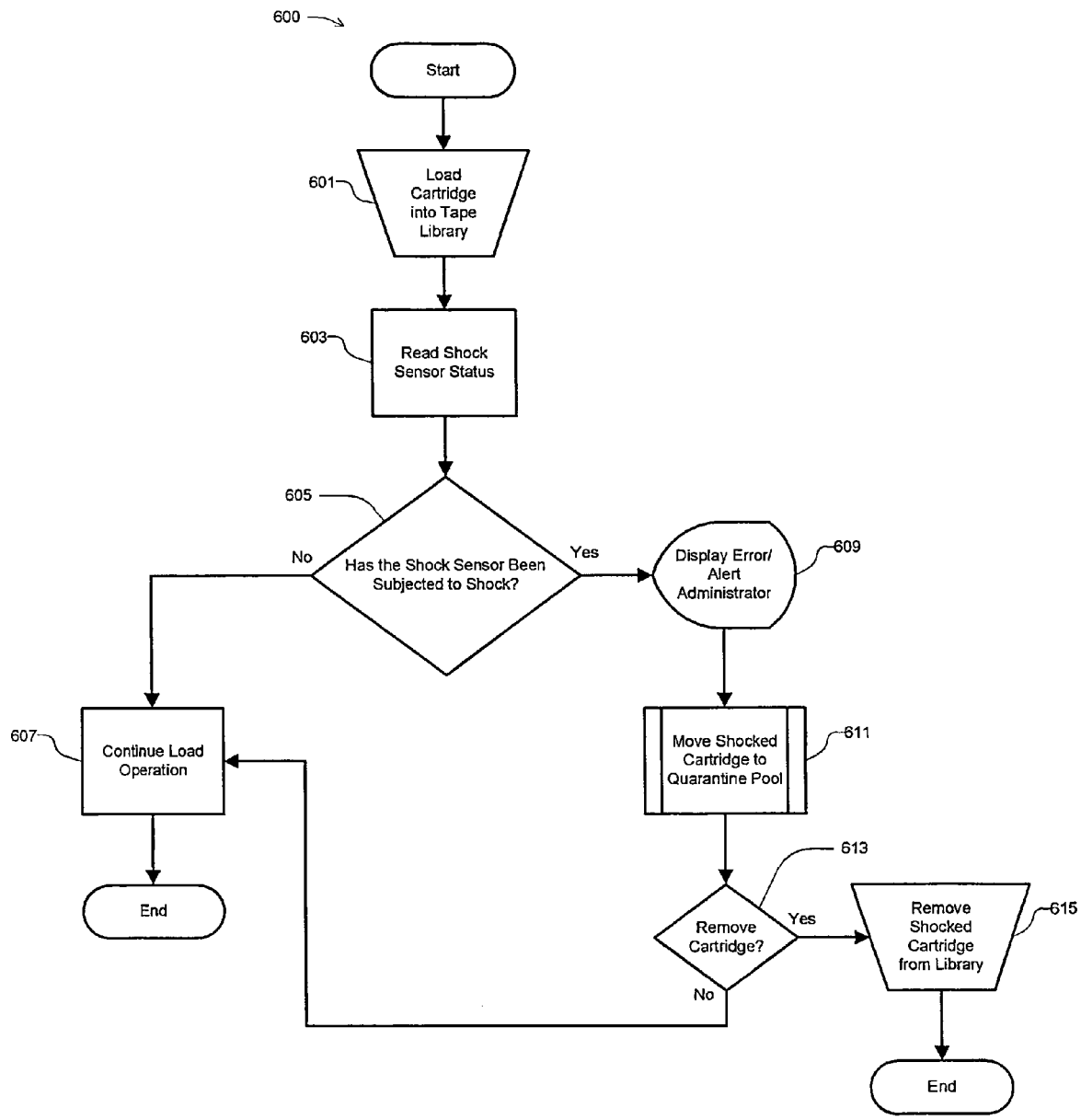
FIG. 8 is a flow chart illustrating the method for controlling cartridge load operations in a data storage system in accordance with the embodiment of the method of the present invention.

FIG. 7 is a generalized block diagram 500 of a tape library 501. The data storage device shown in FIG. 1 is housed in the tape library 501 of FIG. 7. It is comprised of a chassis or frame either rack mounted or free standing and contain any number of drive or media frames. The present example 500 indicates a single frame library 501 for illustration purposes. A tape library 501 by definition will contain slots 503 to hold cartridges 103, an entry/exit (E/E) port(s) 517 to permit import and export of data storage cartridges 103 and drive bays 547 for installation of a data storage drive(s) 101 or 521 and 525 for reading and writing data cartridges 103. A library 501 can contain as few as 24 slots 503 and up to 30,000 slots or more.

Slots that are licensed to store data storage cartridges 103 are usually allocated to various storage pools 505. Slots that are present in the library, but not licensed are normally unavailable to the library and not visible to backup applications and are referred to as unassigned slots 509. In an embodiment of the present invention a new type of slot is introduced called a quarantine slot 507. Quarantine slots 507 will be used to temporarily store shocked cartridges 103 until they are removed from the library 501 or an operator or administrator override 613 is issued and released to storage slots 505 for normal operations which may include eventual loading into data storage drives 521 and/or 525.

Additionally, a transporter or robot mechanism 511 will be present to import, export and move data storage cartridges 103 from slot 503 to slot, slot to drive 521 or 525 (load) and drive to slot (unload). The transporter mechanism 511 may also be integrated with a picker mechanism 515 for physically manipulating cartridges 103 and an optical barcode reader 513 to read barcodes 207 on tape labels (of the type disclosed in FIG. 3 as 201 or in FIG. 4 as 209) and can preferably also read modified barcode labels (of the type disclosed in FIG. 4 as 211) with an integrated shock sensor 300 as shown in an embodiment of the present invention. The transporter mechanism 511 will move about the x, y and z-axis 519 of the tape library 501 by various mechanisms to accomplish cartridge 103 moves, load and unload operations from data storage drives 521 or 525.

The library control module 529 controls all library 501 operations and management functions and is composed of several major components, including the library controller 531, remote library controller 533, robotics control module 537, Non-Volatile Random-Access Memory (NVRAM) 539 and an operating system 535. The operating system 535 links and controls all major components of the tape library 501 and is usually stored in NVRAM 539. The operating system 535 is often upgradeable and in an embodiment of the present invention can be modified to introduce the concept of quarantine slots 507, subroutines 600 and instruction set modifications to the bar code reader to permit the present invention 200 to be utilized. The operating system 535 is usually executed by a processor on the Library controller 531 for local operations or on the remote library controller 533 in the event of remote operation via remote network by Ethernet port 541. The operating system 535 will also govern the Robotics Control Module 537, which controls all aspects of the transporter 511 movement and function.

Several interfaces 541, 543 and 545 will also be present on the tape library 501 and are usually part of the library control module 529 to allow for management and communication such as an Ethernet port 541, serial port 543 and/or Universal Serial Bus (USB) port 545. The library control module 529 and its resident operating system 535 manage the Ethernet 541, serial port 543 and USB interfaces 545 in the present example 500.

Data storage drives 521 and 525 may contain multiple storage specific interfaces 549, 551 and 553, 555 such as SCSI, iSCSI or Fibre Channel for direct connection to hosts, backup servers, media servers or via indirect connection to similar devices via Storage Area Network (SAN) or Local Area Network (LAN) switches. Drives 521 and 525 may contain a drive control module 523 and 527, which may be integrated in an optional drive sled to control drive 521 and 525 operations and/or management functions via commands from the library control module 529. Modern tape libraries 501 can have anywhere from one to 120 data storage drives 101 with future designs projected to support upwards of four hundred drives. Also part of the tape library are power control module 560 with its power supplies 561, 562 respectively, and fan control module 570 with its fans 571, 572.

FIG. 6 is a flow chart description 600 of one embodiment of a method for the load operation that a tape library 501 or similar device could perform when a data storage cartridge 103 such as in FIG. 1 is inserted into a device as described in FIG. 5. When the data storage cartridge is loaded as described by block 601 the Shock Sensor can be read as per block 603 and a decision can then be made based upon that reading, as seen in block 605. Based on that decision, the tape library 501 can possibly perform two different actions. If the Shock Sensor Status is negative 205 in whether it was subjected to significant shock or not, then the tape library can continue to perform the normal course of actions described by block 607 as per the instruction set of the tape library 501 or similar device. If the shock sensor has been subjected to a shock event in excess of a predetermined threshold that would result in the reading of the Shock Sensor being positive 211, then the tape library 501 could display an error message on monitor 557 to alert an administrator or designated recipient, as indicated by block 609. Once the alert has been logged, the tape library 501 may then move the shocked data storage device 103 to designated Quarantine Slots 507 as shown in block 611. The administrative user of the tape library 501 could then be given the option to remove the shocked data storage device 103 from the tape library 501 as indicated in block 613. If the administrative user would decide to remove the shocked data storage device 103, then it would be removed as indicated in block 615. However, if the administrative user issues an override and decides to leave the shocked data storage device 103 in the tape library 501, then the tape library 501 would continue the load operation as indicated by block 607.

While the form of apparatus and method herein described constitute a preferred embodiment of the apparatus and method of the present invention, it is to be understood that the invention is not limited to this precise form of apparatus or method of using the apparatus, and that changes may be made therein without departing from the scope of the invention which is defined in the appended claims.

What is claimed is:

1. A removable data storage cartridge device comprising:
   a housing,
   a tape medium contained in said housing, and
   a passive shock detection sensor, said passive shock detection sensor being a mechanical device free of application, transmission or storage of electrical current to detect, record or indicate that a shock event has occurred, said passive shock detection sensor secured to said housing that records shock to said cartridge by indicating a machine-readable shocked status.

2. The device according to claim 1, wherein said shock is a deceleration of said device at a predetermined threshold.

3. The device according to claim 2, wherein said predetermined threshold is at least 390 m/sec2 or 40 G.

4. The device according to claim 1, wherein said shock detection sensor is integrated in a barcode label attached to said cartridge.

5. The device according to claim 4, wherein said barcode label has a barcode data string consisting of a start character, a plurality of alphanumeric characters, an optional checksum character, and a stop character.

6. The device according to claim 5, wherein each of said start and stop characters are preceded and followed by quiet zones.

7. The device according to claim 4, wherein a portion of said label indicates if a shock event has occurred.

8. The device according to claim 7, wherein a shock event of a predetermined threshold is visually displayed on said cartridge.

9. A tape library comprising:
   a chassis containing any number of drive or media frames,
   slots that store removable data storage cartridges, each of said cartridges having a passive shock detection system, said passive shock detection system having a passive shock detection sensor, said passive shock detection sensor being a mechanical device free of application, transmission or storage of electrical current to detect, record or indicate that a shock event has occurred,
   data storage drives that read and write data storage cartridges,
   a transporter mechanism that imports, exports and moves data storage cartridges between slots, from a slot to a drive, or from a drive to a slot,
   a network connection to communicate with backup software applications,
   a front panel, said front panel consisting of a display and means for issuing commands and receiving feedback from said tape library, and
   a controller, said controller including an operating system that manages said tape library, said operating system containing specialized add-on code to instruct said transporter mechanism to detect shocked cartridge status via disrupted barcode.

10. The tape library according to claim 9 which includes an entry/exit pool and a tape library barcode reader.

11. The tape library according to claim 9, wherein said the tape library has firmware and/or an operating system that can be altered to prevent loading of a damaged cartridge into a data storage drive mechanism.

12. The tape library according to claim 9, wherein the tape library controller alerts the operator and/or administrator of the tape library via the tape library front panel, and/or the backup software administration, and/or the operator console(s).

13. A method for controlling data storage cartridge load operations in a data storage system comprising the steps of:
   querying the shock status of a data cartridge having a passive shock detection sensor when the cartridge is imported into a tape library, said passive shock detection sensor being a mechanical device free of application, transmission or storage of electrical current to detect, record or indicate that a shock event has occurred,
   moving a shocked cartridge to dedicated slots in the tape library should the query of the cartridge indicate a shocked status, said dedicated slots defining the quarantine pool, and
   inhibiting the movement of any cartridges in the quarantine pool, the tape library being configurable to allow export from the library or to allow an operator override to continue load operations.

14. The method according to claim 13 which includes the step of sending SCSI commands to the backup system indicating the cartridge location in the library and the disabled status of the cartridge.

15. The method according to claim 13 which includes the step of sending XML formatted data via a library controller network interface indicating the cartridge location in the library and the disabled status of the cartridge.

* * * * *